UNITED STATES PATENT OFFICE.

WILLIAM COULTAS, OF STOCKTON-ON-TEES, COUNTY OF DURHAM, ENGLAND, ASSIGNOR TO THOMAS COULTAS, OF PITTSBURG, PENNSYLVANIA.

COMPOSITE ROOFING.

SPECIFICATION forming part of Letters Patent No. 311,569, dated February 3, 1885.

Application filed November 24, 1884. (No specimens.)

*To all whom it may concern:*

Be it known that I, WILLIAM COULTAS, a resident of Stockton-on-Tees, in the county of Durham, England, have invented a new and useful Improvement in Composite Roofing; and I do hereby declare the following to be a full, clear, and exact description thereof.

My invention has for its object the prevention of radiation of heat from steam-engine boilers and pipes, or other heated surfaces; or to protect roofs, water-pipes, cisterns, conduits, and other places from water and cold, and, generally, to serve as an insulator of heat.

It consists of a plastic composition for covering the surfaces of such articles, and is made in manner and of material as follows: The basis or principal substance in the compound is clay—preferably a strong and tough brick-clay—which is mixed with water until it acquires the consistency of a thin paste. To this is added sufficient fibrous material which when mingled with the paste will make it strong and durable. Other substances may be added to thicken the composition, and when it is about the consistency of common plaster-mortar it is ready to be applied. It is plastered or daubed over the surface to be covered and allowed to dry. After having dried, especially if the surface covered be heated, the plaster may crack in many places, and it may be necessary to put on another thin coat to fill the interstices and make the surface uniform. When this is done, it is covered with a coating of fluid tar which sinks into the pores of the argillaceous coating, and is absorbed by the clay and by the fibers contained therein. After the tar has been absorbed it will be advantageous to paint the surface again with melted pitch, or with a mixture of tar and melted pitch, to protect the composition more perfectly from the weather. It is advisable to apply the tar when the pipes or boilers are heated, since it will then sink more thoroughly into the mixture.

The use of the tar covering is an indispensable feature of my invention, and performs several important functions. It makes the covering water-proof, both as to water coming from without and as to steam escaping from the inclosed pipes or boilers, since unless the clay coating be very thick the outer coating of tar will penetrate almost to the inner surface. This adds greatly to the durability of the covering, because, ordinarily, the effect of steam and water upon clay is to rapidly disintegrate it. The tar also makes the compound elastic, so that while the clay coating when used alone would crack under the expansion and contraction of heat and cold, the tar causes it to adhere and stretch sufficiently to compensate for the action of varying temperature. Another effect of the tar is to preserve the intermingled fibers of the composition from being injured or broken. The capillary attraction of the fibers will cause the tar to be absorbed by their whole length, even though it may sink into the clay for only a short distance. The tar protects the fibers from dampness and rotting. It also lubricates them, so that as the clay expands unequally with the heat it may slip over the fibers without pulling them, as it would if the fibers and the clay were perfectly dry. On account of the last-named quality I have been enabled to overcome a most objectionable feature incident to the use of clay boiler-coverings. It makes the whole mass more consistent and durable. The tar also, in filling the pores of the clay, increases its insulating properties. The outer coat of melted pitch, or mingled pitch and tar, serves to preserve the composition more perfectly from exposure to dampness, rain, or snow, and when the pitch hardens it obviates the disagreeable consequence of the sticky surface of tar.

In practice it will generally be found expedient to plaster the clay composition upon the boiler-surface in two or more layers or coats, since a too thick coat put on at once is apt to crack and fall off. In such case the first thin coat should be allowed to set and dry before the second one is put on, and the tar should not be applied until after the second coat has become hard. The reason for this is that tar applied to a thin first coat will be absorbed by its entire mass, and will come in contact with the surface of the article covered, thus making the clay too greasy, preventing its intimate connection with the surface, and causing the composition to scale and fall off.

I have given a general description of the nature of the composition which I use; but, more particularly, I prefer to use the following ingredients in its manufacture: Clay of the nature described is mixed with water until it forms a thin paste. Shives, which are the short waste combings of flax or hemp, and some other fibrous material of a longer fiber than the shives, together with common chimney-soot, are added until the mass acquires a tenacious consistency. The shives are useful in binding the mass together on account of their great tenacity. They also serve as an excellent absorbent for the coating of tar. The shives are not generally long enough to prevent cracking of the composition, and to bind it more perfectly I add the longer fibers of horse-hair, cocoanut fibers, or similar materials. The function of the soot is to give the compound a rich dark color and to cause it to set more firmly when applied. Care should be taken that there be not too great a proportion of clay used in relation to the fibrous ingredients, since, if so, the compound will scale when put upon a heated surface or exposed to the weather.

My improved composition is also well adapted to use in roofing buildings and oil tanks or stills, since it will last for a long time, is cheap, and is an excellent protector against water.

Having thus described my improvement so that others skilled in the art to which it appertains may manufacture and use it, what I claim as my invention, and desire to secure by Letters Patent, is—

1. A covering for boilers, roofs, or other surfaces, which consists of an argillaceous paste or plaster mixed with fiber, the composition so made being coated with tar after it has been applied to the surface to be covered, substantially as and for the purposes described.

2. A covering for boilers, roofs, or other surfaces, which consists of an argillaceous paste or plaster mixed with shives and other longer fiber and soot, the composition so made being coated with tar after it has been applied to the surface to be covered, substantially as and for the purposes described.

3. A covering for boilers, roofs, or other surfaces, which consists of an argillaceous paste or plaster mixed with fiber and soot, the composition so made being coated with tar after it has been applied to the surface to be covered, and finally coated with a mixture of melted pitch and tar, substantially as and for the purposes described.

In testimony whereof I have hereunto set my hand this 3d day of November, A. D. 1884.

WILLIAM COULTAS.

Witnesses:
 THOMAS GALE,
 J. CRAGGS.